(12) United States Patent
Mirza

(10) Patent No.: US 8,730,940 B2
(45) Date of Patent: May 20, 2014

(54) SWITCHING SYSTEM

(75) Inventor: Shehzad Mirza, Brentwood (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 1146 days.

(21) Appl. No.: 12/087,012

(22) PCT Filed: Jan. 11, 2007

(86) PCT No.: PCT/GB2007/000077
§ 371 (c)(1),
(2), (4) Date: Jun. 24, 2008

(87) PCT Pub. No.: WO2007/085794
PCT Pub. Date: Aug. 2, 2007

(65) Prior Publication Data
US 2010/0220600 A1    Sep. 2, 2010

(30) Foreign Application Priority Data
Jan. 25, 2006    (EP) .................................... 06250400

(51) Int. Cl.
*H04L 12/28* (2006.01)
*H04L 12/46* (2006.01)
*H04L 12/56* (2006.01)

(52) U.S. Cl.
CPC ............ *H04L 12/4625* (2013.01); *H04L 49/30* (2013.01); *H04L 45/02* (2013.01)
USPC ......................................... 370/351; 370/400

(58) Field of Classification Search
CPC ...... H04L 49/30; H04L 12/4625; H04L 45/02
USPC ......... 370/400, 229, 401, 402, 389, 216, 217, 370/219, 220, 221, 225, 228, 238, 238.1, 370/242, 248, 230–237, 351, 395.31
See application file for complete search history.

(56) References Cited

U.S. PATENT DOCUMENTS 5,640,504 A * 6/1997 Johnson, Jr. .................. 714/4.4
5,920,410 A    7/1999 Smith et al.
(Continued)

FOREIGN PATENT DOCUMENTS

| | | |
|---|---|---|
| GB | 2 389 261 | 12/2003 |
| JP | 10-256990 | 9/1998 |
| JP | 2006-005922 | 1/2001 |

OTHER PUBLICATIONS

Anonymous, "ITU-T Recommendation G.983.1—Broadband Optical Access Systems Based on Passive Optical Networks (P On) Recommendation", *International Telecommunication Union*, Jan. 2005, pp. 113-116, XP002380493.

(Continued)

*Primary Examiner* — Brenda H Pham
(74) *Attorney, Agent, or Firm* — Nixon & Vanderhye P.C.

(57) ABSTRACT

An Ethernet access connection (102) connects a user access point (10) to an access node (12) in the network. The access connection comprises a passive coupler (20), by means of which a further access connection (104) can be provided between the user access point (10) and a second access node (14), such that data can be exchanged over each access connection (102, 104) between the user access point and the network. This duplication ensures that communication is not severed if the access connection (102) is breached. To avoid interference at the destination terminal (11) between the two resulting identical data streams, the access nodes (13, 18) giving access to the destination terminal are controlled such that only one of them forwards data to the destination access point (11), with the capability to switch to the other one in the event of a loss of connection between the access node (13) and user access point (10).

15 Claims, 7 Drawing Sheets

(56) References Cited

U.S. PATENT DOCUMENTS

| | | | |
|---|---|---|---|
| 6,366,559 B1* | 4/2002 | Krishnan et al. | 370/230 |
| 6,842,788 B1* | 1/2005 | Ghanwani et al. | 709/238 |
| 6,985,488 B2* | 1/2006 | Pan et al. | 370/395.3 |
| 7,046,634 B2* | 5/2006 | Wong et al. | 370/238 |
| 7,417,950 B2* | 8/2008 | Hofmeister et al. | 370/230 |
| 7,583,593 B2* | 9/2009 | Guichard et al. | 370/225 |
| 2004/0033077 A1 | 2/2004 | Kim et al. | |
| 2005/0047332 A1 | 3/2005 | Lee et al. | |
| 2005/0276283 A1 | 12/2005 | Gyselings et al. | |

OTHER PUBLICATIONS

Office Action (3 pgs.) dated Apr. 12, 2010 issued in corresponding European Application No. 07 700 367.1.
Applicant Response (2 pgs.) to Apr. 12, 2010 Office Action issued in European Application No. 07 700 367.1.
Office Action (4 pgs.) dated Jun. 22, 2011 issued in corresponding European Application No. 07 700 367.1.
U.S. Appl. No. 12/926,192, filed Nov. 1, 2010.
Translation of Office Action dated Aug. 2, 2011 (5 pgs.) issued in corresponding Japanese Application No. 2008-551852.

* cited by examiner

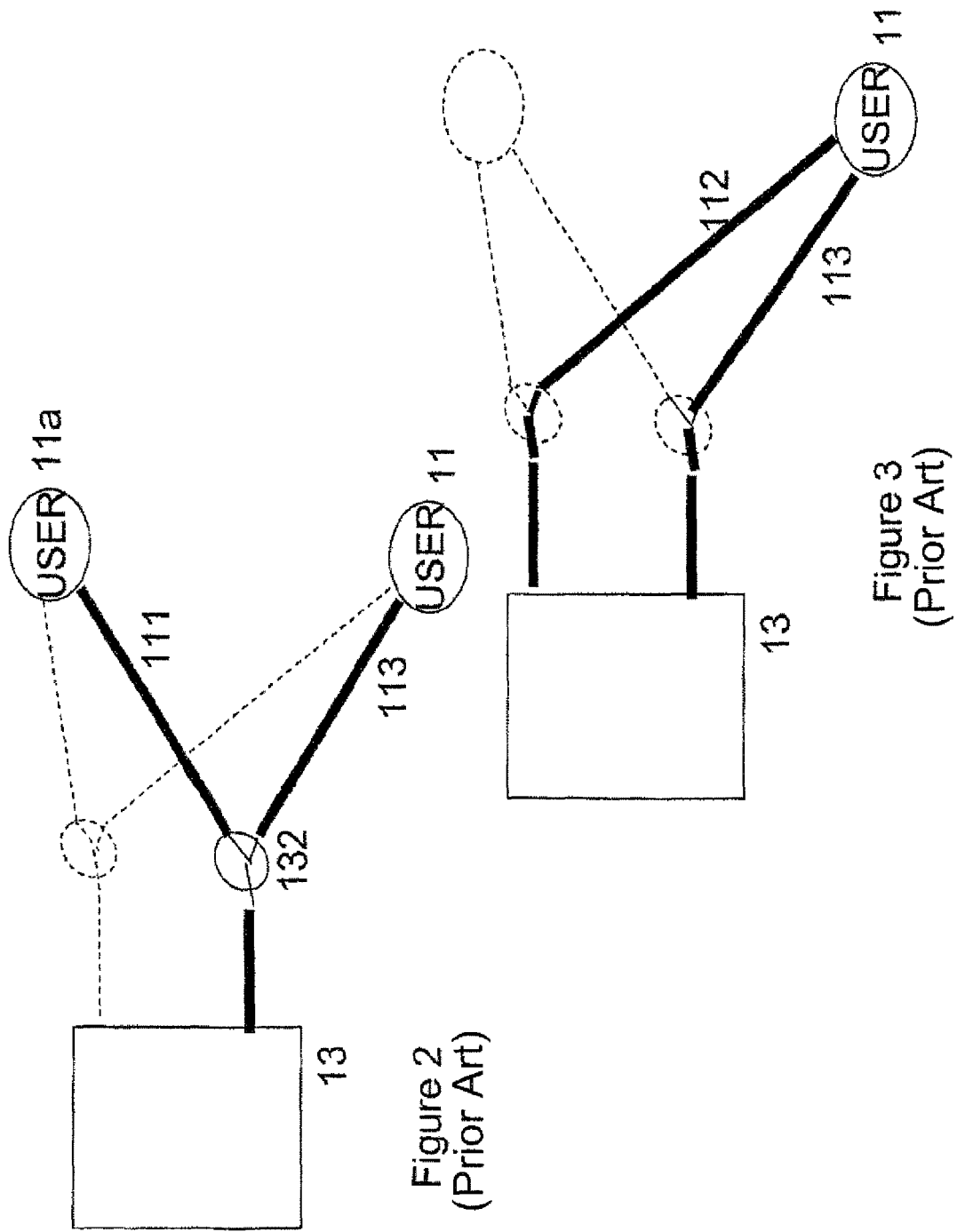

ical phase of International
SWITCHING SYSTEM

This application is the U.S. national phase of International Application No. PCT/GB2007/000077 filed 11 Jan. 2007 which designated the U.S. and claims priority to European Patent Application No. 06250400.6 filed 25 Jan. 2006, the entire contents of each of which are hereby incorporated by reference.

BACKGROUND AND BRIEF SUMMARY

This invention relates to packet data switching systems, and relates in particular to a means for preventing loss of service resulting from damage to an end user's access connection. It is of particular application to systems of the type known as "Ethernet" or those according to the IEEE 802.3 standard. In this specification, the term "Ethernet" embraces any network using Ethernet or IEEE 802.3 frames, including MPLS (Multiprotocol Label Switching) networks using Ethernet frames, and other networks operating on similar principles.

A simple Ethernet packet data switching system is shown at FIG. 1. For clarity only two access points are shown. These access points comprise terminal equipment 10, 11 which are typically owned by the customer and located on his premises, and provide the interface between the customer equipment and the public network. These access points are each connected by access connections 102, 113, to respective local nodes 12, 13. These local nodes direct the packets, by way of intermediate nodes e.g. 16 according to the address of the destination node carried in the header. On arrival at the destination node (e.g. 13) the packet is then forwarded to the access point 11. Note that any of the nodes 12-18 can serve as a local node for an associated access point. The individual connections 102, 126, 163, 113, etc may be of any type, such as wireless, wired or optical fibre. In the embodiment to be described the access connections are optical, but this is not to be taken as limitative.

Each local node 13 is typically connected to a plurality of user access points 11, 11a. As shown in United States Patent Application US2005/0047332, and in FIG. 2 of the attached drawings to the present specification, a passive optical coupler 132 is used to provide connections 111, 113 from a single local node 13 to several access points 11, 11a, with a multiplex imposed to separate data originating from, or destined for, each individual user. Passive couplers are well-known in the art: their function is to split a signal, or to combine two signals such that a single port can be connected to two ports. As will be described in relation to FIG. 7, passive couplers of this kind are also commonly used to connect separate input/output ports 31, 32 to a bidirectional port 30.

It will be seen that there is redundancy in the network, allowing packets to be transmitted by a variety of routes between the local nodes 12, 13. Thus, should an individual link 126 be overloaded or severed, data can still pass between the local nodes 12, 13 using some alternative route, e.g. via links 127, 178, 183.

In general, routing is carried out autonomously by the individual nodes 12-18, reading the address data in the packets. An overall control function 19 supervises the nodes (as indicated by the dotted lines) to monitor for link failures, and the like.

A problem arises if the link 102 between an access point 10 and its local node 12 is damaged. As there is no redundancy on this link 102, any damage to this connection severs the end-to-end link between the end users at the access points 10, 11. This connection 102, between the user's own terminal equipment at the access point 10 and the network access node 12, is necessarily partially located on the user premises, making it not only particularly vulnerable to damage, but harder for a network operator to gain access for repairs. A cost effective way of extending network redundancy into the access connections would therefore be desirable, especially if it can be achieved without modifying the equipment located on the user premises at the access points 10, 11, which may be owned by the customer of the provider of the respective access links 102, 113.

It is known, for example from United States Patent Application US2005/0047332 mentioned above, and as illustrated in FIG. 3 of the drawings attached to the present specification, to provide duplicate connections 112; 113 from a node 13 to each user access point 11. However, this system requires the user equipment to set up a main and a standby link to the local node, each link having its own physical termination point in the user equipment, and its own network address. According to the invention, this complexity can be avoided by providing an access connection for providing access between a user access point and an access node forming part of an Ethernet network (as hereinbefore defined) comprising a plurality of nodes, characterised in that the access connection comprises one or more passive couplers, by means of which the user access point is provided with a plurality of access connections to one or more access nodes such that data can be exchanged, over each access connection, between the user access point and the one or more access nodes, and means for controlling the access node or nodes such that only one of the access connections transmits the data received from the network to the user access point. It will be noted that, unlike the configuration used in the prior art reference, the present invention does not use the passive coupler to connect a single network access node to a plurality of user access points. Instead, the coupler is reversed such that it connects a single user access point to a plurality of network access nodes. This invention therefore requires minimal modification to the user terminal equipment to provide the security of a redundant path. Instead, the network access nodes are controlled to avoid collision in the data between the duplicate paths. Thus, the customer equipment is kept as simple as possible, and any complexity is in the operator's network, where it is easier to supervise and maintain.

Encapsulation of packets is common in some packet systems but not normally required in Ethernet systems. However, in this invention encapsulation is desirable in order to prevent the formation of loops within the network. In a preferred embodiment, it is therefore desirable for each access node to provide means for generating a distinct encapsulation of the data transmitted to it from the user access point for transmission over the network, and means for de-encapsulation of data destined for the user access point that it receives from elsewhere in the network, for transmission to the user access point.

The provision of a distinct encapsulation for each instance of data prevents the formation of loops within the network. At the destination access node or nodes, the data is de-encapsulated, resulting in two identical data streams (save for any loss or corruption en route). However, path and phase differences would cause multiple sets of de-encapsulated data to interfere with each other at the user equipment if both streams were to be successfully delivered to the destination user access points, through intact access connections Thus co-operation between the access paths is required to ensure that only one set of de-encapsulated data arrives at the user access point. This may be achieved by comparing de-encapsulated packets, and not forwarding any that have already been sent. However, it is preferred to designate a first access connection path as the path over which data is sent by default, monitoring the return connection path, and in the event that a loss of data is detected on that return path, switching to the other access connection path. The loss of access path due to fibre break is detected at the access node as a 'Loss of Signal' condition.

In a preferred arrangement, single-fibre links are used, typically implemented using 'Bi-Di' (Bi-directional transmission on a single fibre) SFP (Small Form Pluggable) optical modules. The use of two separate fibre connections (for transmit and receive) is possible, but in that case a Backward Defect Indication signal would need to be in place for the access node to detect a single-fibre break that causes a Loss of Signal condition on the user port.

The invention also provides an access node for an Ethernet network comprising means for receiving data packets over an access connection from a user access point, means for forwarding the packets to other nodes in a network, means for receiving data packets from other nodes in the network, and means for forwarding the packets over the access connection to a user access point, characterised by means for detecting traffic received over the access connection, means for comparing the detected traffic information relating to plurality of such connections to the same user access point, and means for selectively suspending the transmission of packets over the access connection to the user access point in accordance with that information.

The invention also provides an Ethernet network comprising a plurality of interconnected access nodes connected by access connections to respective user access points, wherein each access node provides means for receiving data transmitted to it from the respective user access point for transmission over the network, and means for transmitting data destined for the user access point that it receives from elsewhere in the network, the system being characterised in that at least one user access point is connected by way of a passive coupler to one or more access nodes by a plurality of access connections such that data can be exchanged between the user access point and the network by a plurality of routes using different access connections, and means for controlling the access nodes such that only one of the access connections transmits data received from the network to the respective user access point.

The invention allows Ethernet access links to customer sited equipment to be protected without the need for that equipment to support any protection scheme.

This increases the range of equipment that can be used for protected access links, as no hardware changes are necessary on the customer equipment other than the addition of couplers between the customer equipment and the access fibres. Small Form Factor Pluggable (SFP)-based interfaces (and Bi-directional SFP modules) may be used, removing the need to provide additional signalling for Remote Defect Indications.

The invention also provides a method of operating an Ethernet network such that data is transmitted to and from user access points by way of respective access nodes connected by access connections to the user access points, characterised in that a user access point is connected by way of a passive coupler to a plurality of access connections such that data can be exchanged between the user access point and the network by a plurality of routes using different access connections, and the access nodes are controlled such that only one of the access connections transmits data received from the network to the respective user access point.

The access nodes may be "virtually" distinct, but physically co-located and sharing some components: all that is required is that they have separate access connections to the user access point, and encapsulate and de-encapsulate the data separately.

The streams can be transported across the network together (with different encapsulations to prevent the formation of loops). One of the streams is designated as the active stream, and the or each other stream as standby streams. Standby streams are blocked, either at the destination or an intermediate node. A loss of signal condition on the access port for the currently active stream would signal the removal of the block on standby stream, allowing it to become the active stream. The original active stream would be redesignated as a standby stream, to avoid interference should it reinstate itself without intervention.

The paths between the access nodes may also have elements in common.

Multiple redundancy may be introduced by having more than one passive coupler: in this case all the access nodes must co-operate such that only one is transmitting to the user access equipment at any given time.

BRIEF DESCRIPTION OF THE DRAWINGS

A number of embodiments of the invention will now be described, by way of example, with reference to the accompanying schematic drawings, in which:

FIGS. 2 and 3 illustrate a prior art configuration, also previously discussed.

DETAILED DESCRIPTION OF EXAMPLE EMBODIMENTS

Figure 1:
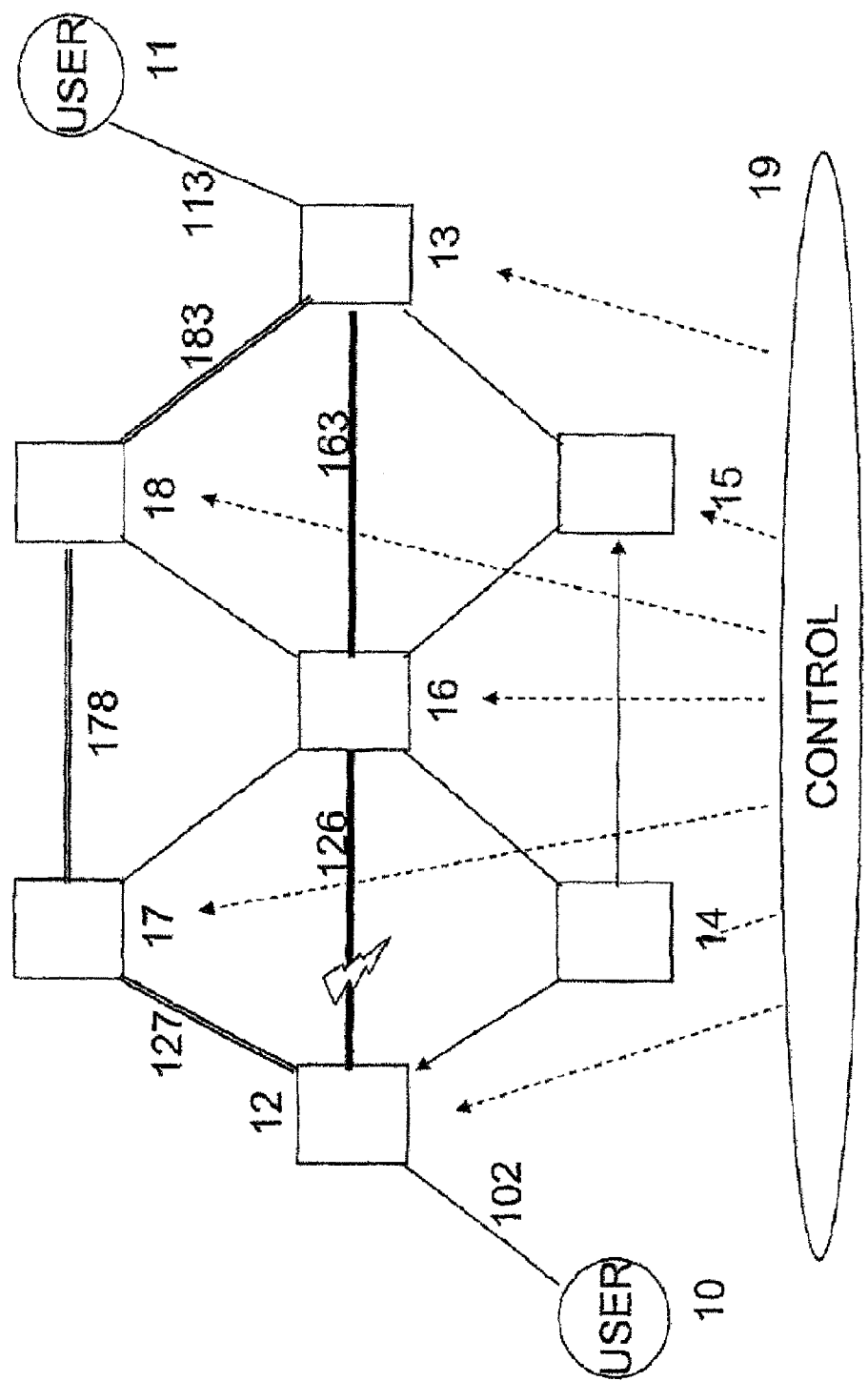
FIG. 1 illustrates a conventional installation, as already discussed.

As already discussed FIG. 1 shows a network of interconnected nodes 12, 13, . . . 18, and a number of user terminals 10, 11 having access connections 102, 113 to respective access nodes 12, 13. In this example the network is optical, but other transmission mediums are possible. All connections shown in FIG. 1 are bidirectional: that is to say that the same fibre is used for transmission in both directions, typically using wavelength division multiplex (WDM) technology to avoid interference between the outward and return paths.

Figure 4:
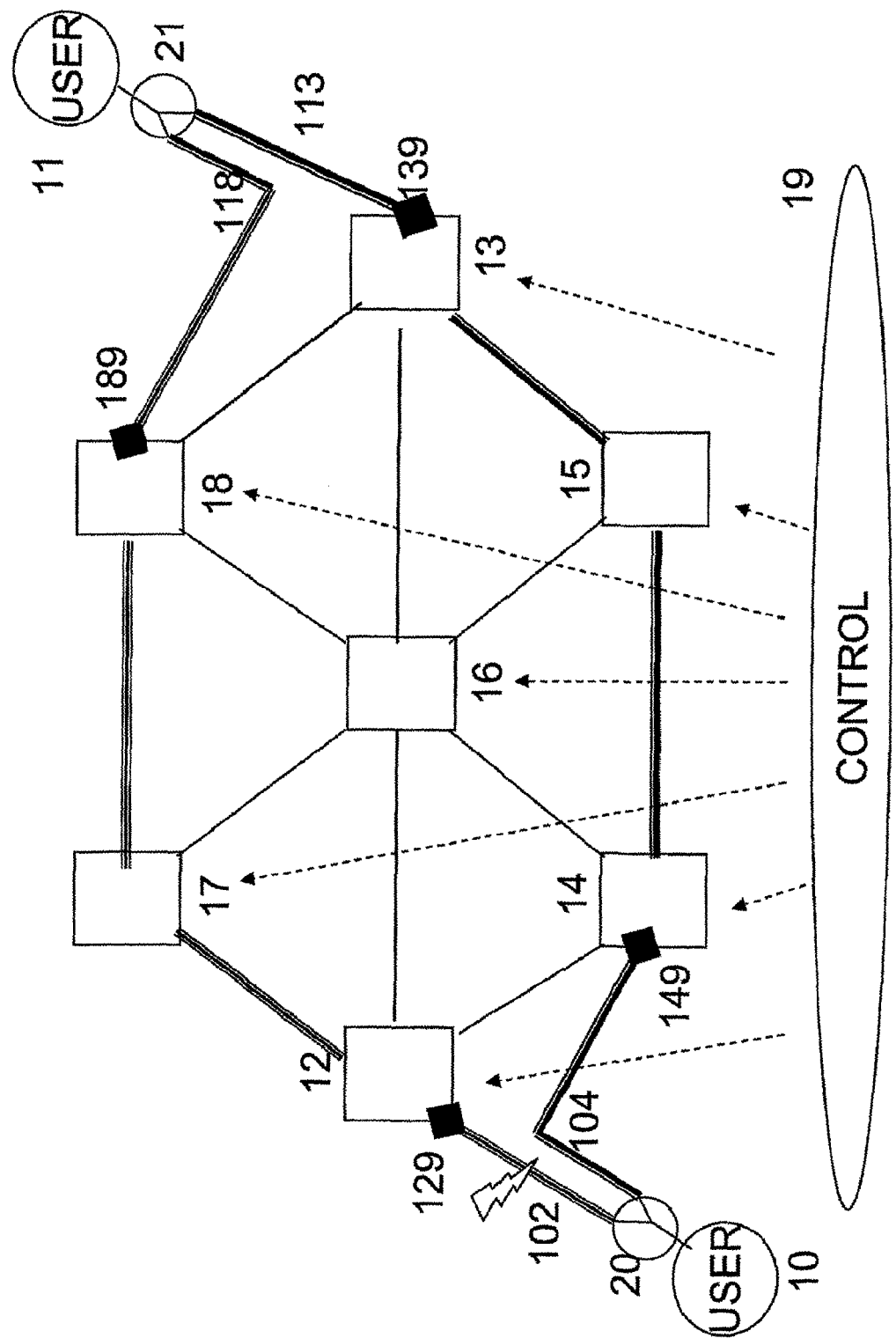
FIG. 4 illustrates an installation incorporating the invention.

FIG. 4 shows a similar network, but with modifications to the access nodes 12, 13 and access connections 102, 113 according to the invention.

Firstly, as shown in FIG. 4, inserted into each access connection 102, 113 is a respective passive coupler 20, 21, allowing provision of a second connection 104, 118, to nodes 14, 18 respectively, each having a corresponding encapsulation facility 149, 189.

Figure 7:
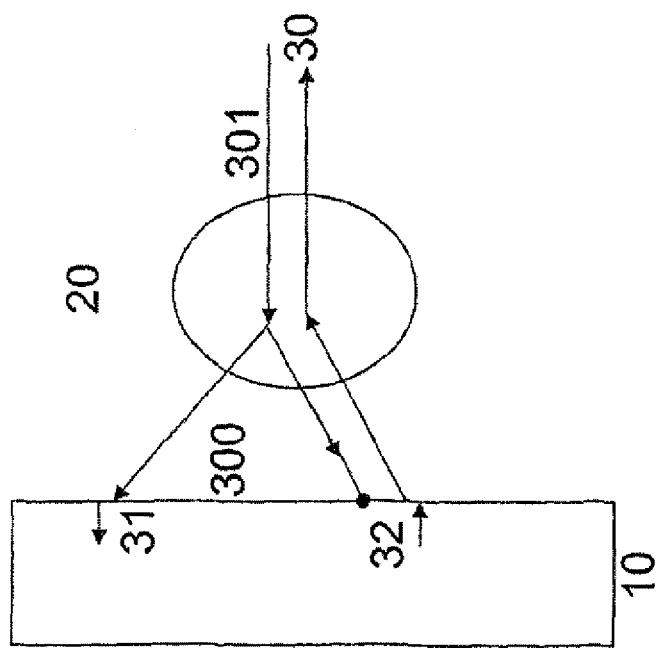
FIG. 7 shows the data flows in a passive optical coupler in normal use.

The operation of a passive coupler will now be discussed with reference to FIGS. 7 and 8. FIG. 7 shows a conventional situation, in which separate input and output ports 31, 32 (e.g.

of a user terminal) are connected to a bidirectional fibre connection 30 using a coupler 20. In this situation the data flow 300 generated by the output port 32 travels to the bidirectional fibre 30. This is the only data to travel in this direction over the fibre 30 as the input port 31 generates no data. The converse data flow 301, passes from the bidirectional fibre 30 to the input port 31. It also travels along the other branch, to the output port 32. However, as no detector is provided in the output port 32, it does not travel any further than this.

Figure 8:
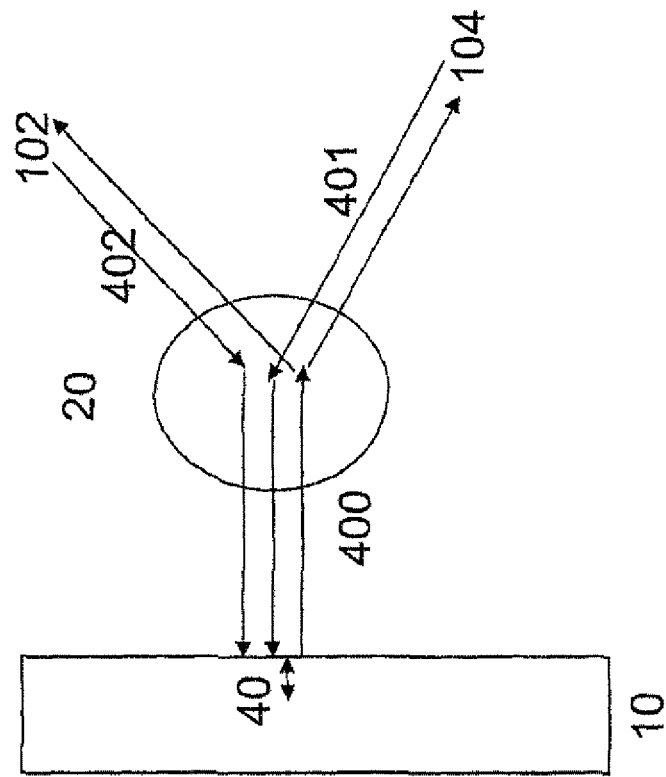
FIG. 8 shows the data flows in a passive optical coupler used according to the invention, illustrating an interference condition.

FIG. 8 shows the configuration used in the invention. In this arrangement, the user terminal 10 has a single bidirectional port 40 (or is connected to another coupler in the manner shown in FIG. 7, so as to present such a connection), and the coupler 20 is then connected to the user terminal 10 the other way round to the one shown in FIG. 7. There are thus two bidirectional branches 102, 104. A data flow 400 generated at the port 40 therefore passes to both branches 102, 104. As shown in FIG. 4, this allows the duplication of paths for the transmission of data to and from the network to originate at the coupler, very close to the user terminal, instead of at the access node 12 as in the prior art arrangement shown in FIG. 1. A break in one of the access connections 102, 104 would not prevent the user communicating with the network 12, 13, . . . 18 and the remote user 11.

As shown in FIG. 4, the duplicate access connections 102, 104 connected to the user terminal 10 through the coupler 20 run to different access nodes 102, 104. They may share a physical route for part of this run: for example the connection 104 between the user's access equipment 10 and one node 14 may run by way of the geographical location of the user's geographically closest access node 12, but have no operative connection with it.

Similarly, the access connections 113, 118 run from the coupler 21 to separate access nodes 13, 18.

Figure 5:
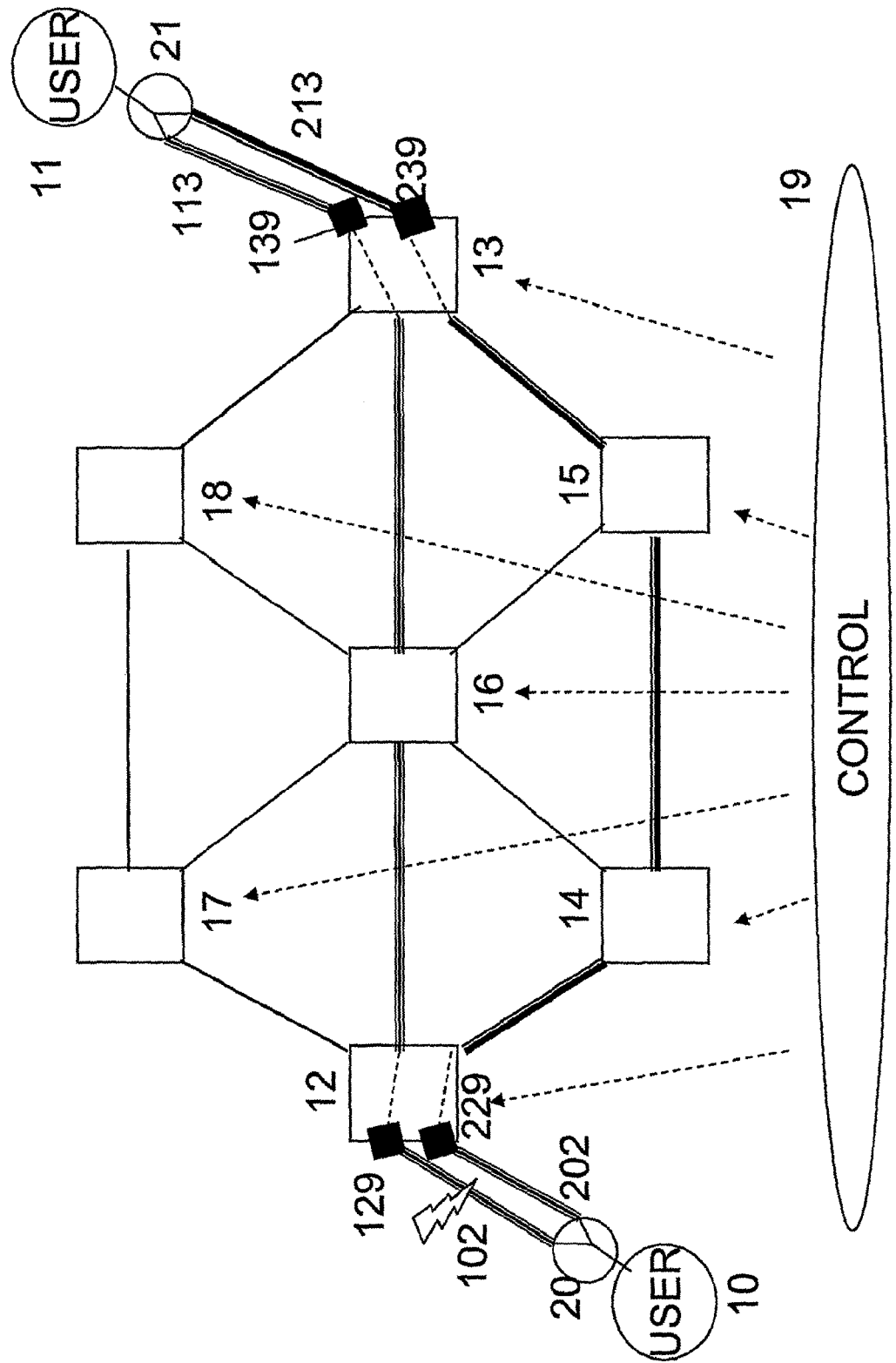
FIG. 5 illustrates an alternative configuration of an installation incorporating the invention.

An alternative arrangement is shown in FIG. 5, in which two connections 102, 202 both run from the user access equipment 10, via the coupler 20, to the same access node 12. Similarly two access links 113 213 both run from the user equipment 11 via a passive coupler 21 to the same access node 13. However, the duplicate streams are handled by the access nodes 12, 13 independently, as if they were being delivered from different access equipments.

Figure 6:
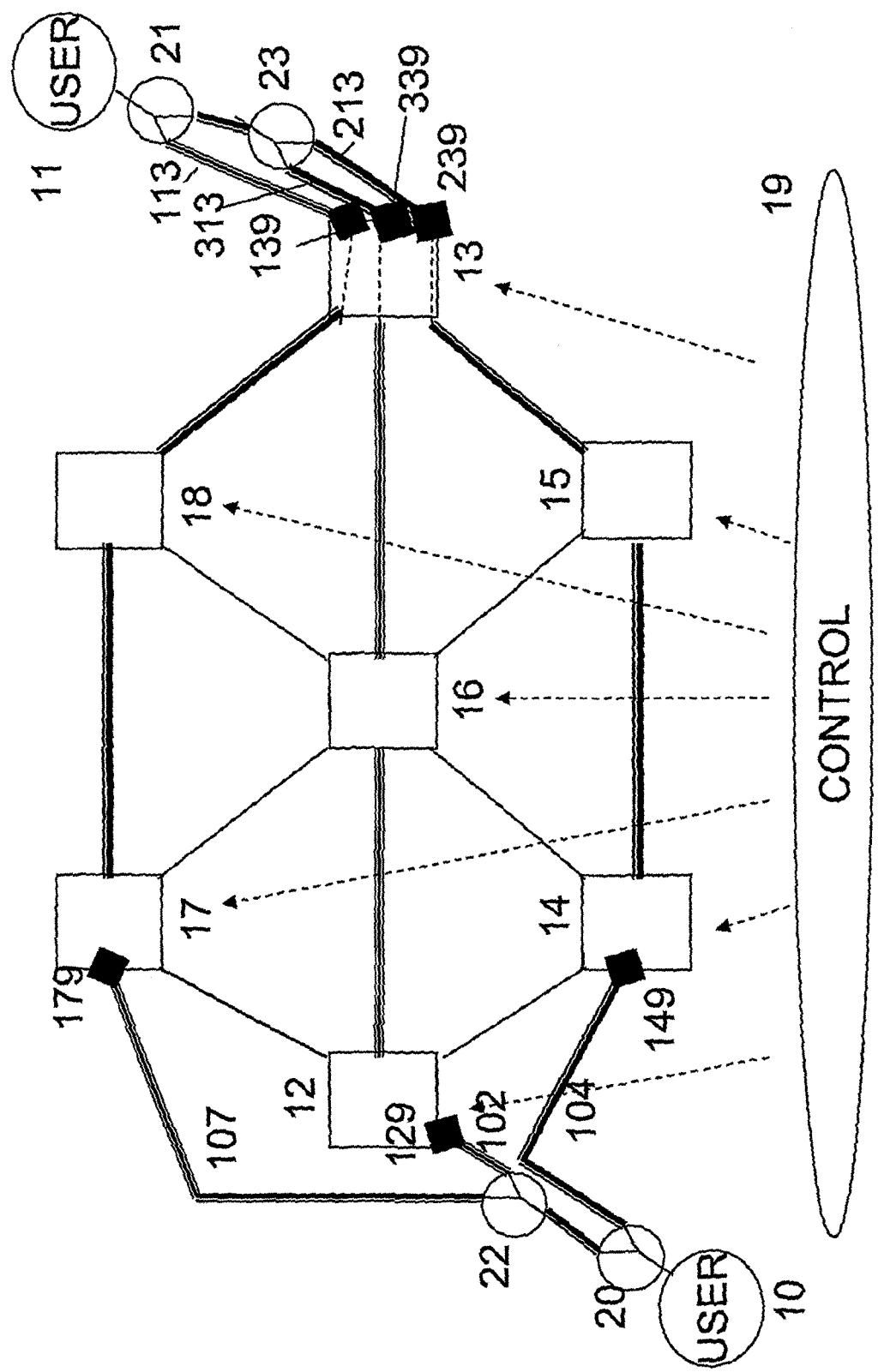
FIG. 6 illustrates another configuration of an installation incorporating the invention.

It is possible to use both real and virtual separation of nodes in the same system, as is shown in FIG. 6, in which user terminal 10 is connected by three separate links 102, 104, 107 to three separate nodes 12, 14, 17, whilst user terminal 11 is connected by three separate access links 113, 213, 313 to one node 13, operating as three separate virtual access nodes. It will be noted that multiple redundancy is incorporated in this embodiment by the provision of an extra passive coupler 22, 23 in each link.

In all the variants shown in FIGS. 4, 5 and 6, an encapsulation facility 129, 149, 179, 229 is provided in each source node 12, 14, 17. The encapsulation facility encapsulates each data stream for transmission to the respective destination nodes 13, 18. The encapsulation involves generating an address header identifying the respective destination node 13. Encapsulated data packets can thus be transmitted between the local nodes 12, 18 or 14, 13, over a route made up of some of the other nodes e.g. 17, 15. These intermediate nodes direct the packets according to the address of the destination node carried in the header. On arrival at the destination node 13, 18 a corresponding de-encapsulation facility 139, 189, 239, 339 is provided to delete the address data from any stream that is received, and the packet is then forwarded to the access point 11.

In all the variants depicted in FIGS. 4, 5 and 6, the individual streams of data carried over the access links 102, 104, 107, 202, or 113, 118, 213, 313 are not encapsulated. Each stream within the network is given a unique encapsulation (129, 149, 179, 229, 139, 189, 239, 339) at the access nodes 12, 13, 14, 17, 18 to provide unique routing and prevent the formation of loops.

The handling of data will now be discussed, primarily with reference to FIG. 4. However, except where differences are discussed, it will be understood that the principles employed are applicable to other configurations, in particular those of FIGS. 5 and 6.

A data stream arriving at a node 12, 14 to which it is addressed will de-encapsulate the data (129, 149) and forward it to the relevant access equipment 10. From FIG. 8 it will be noted that the bidirectional input port 40 of the terminal 10 will receive two separate data streams 401, 402, one from each branch 102, 104. Since this data has already been de-encapsulated, the two data streams 401, 402 should be identical, except for any lost or corrupted packets, and a phase difference resulting from differences in the effective path lengths resulting from buffering, path length differences etc.

This phase difference would cause the two incoming bitstreams 401, 402 to interfere. Note that the conventional use of a passive coupler does not cause the same problem as, with reference to FIG. 7, the input port 31 will not generate any data to interfere with the data 300 generated by the output port 32. Moreover, although the data generated by the single port 30 will arrive at both of the pair of ports 31, 32, the output port is not equipped with a detector and will therefore not respond to the data stream 301 that arrives there.

To overcome the interference that would occur between the two bitstreams 401, 402, an additional control function is introduced to select one of the duplicate paths 102, 104, over which data is to be forwarded from the respective access node 12, 14 to the user access terminal 10. The path 104 that is not selected is blocked at the access node 14.

Figure 9:
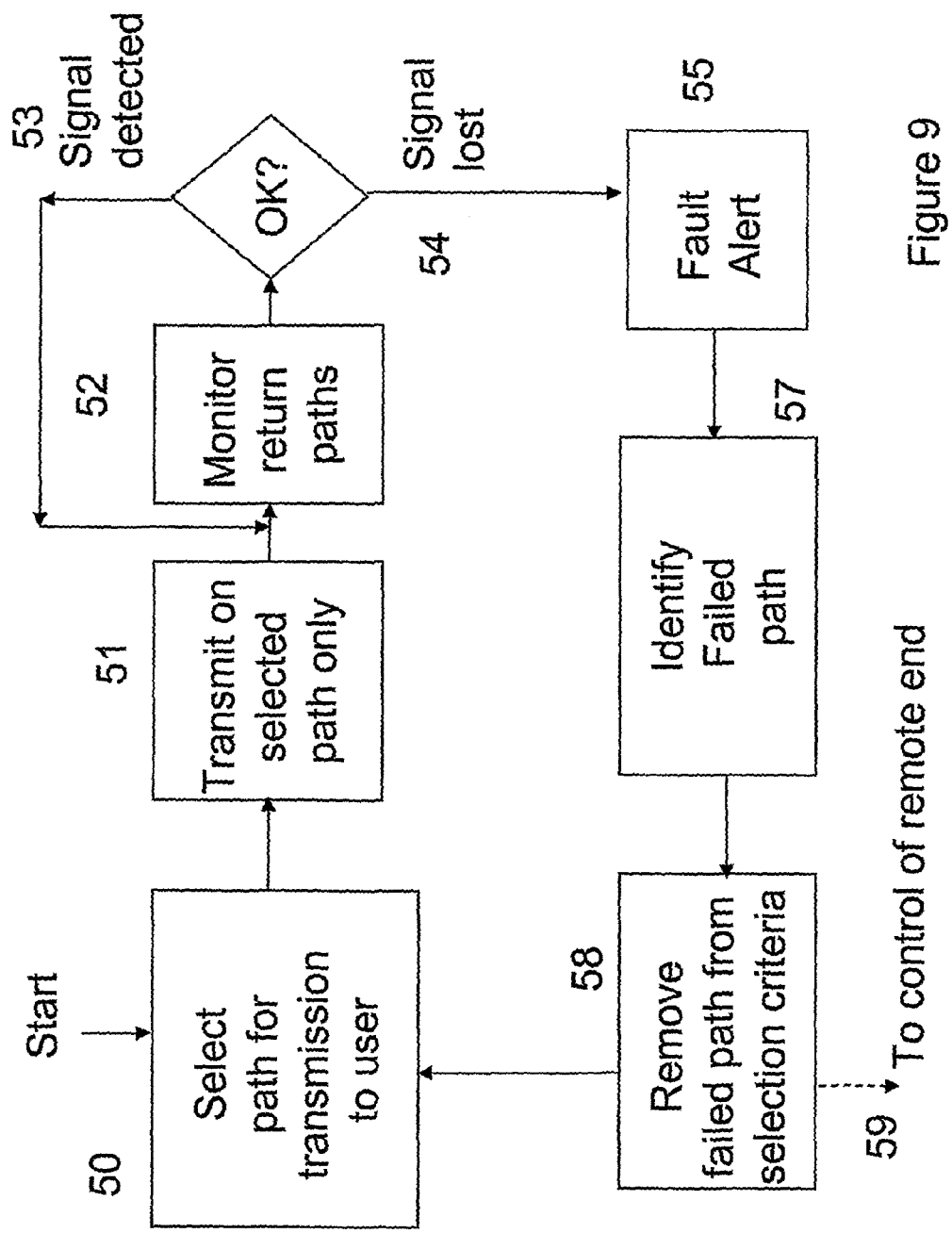
FIG. 9 illustrates a logical flow chart demonstrating the control of the access nodes to avoid such interference.

As shown in the Figures, the control function can be managed by a separate network control system 19. Alternatively, nodes may operate in groups, with the control function 19 embodied in a first node 12, controlling the operation of one or more associated nodes 14. If a node 13 operates as a group of virtual nodes 139, 239, as shown in FIG. 5, the control function can be managed autonomously by that node. The operation of the control function is similar in each case, and is illustrated in the flow chart of FIG. 9, as will now be discussed with reference to the access nodes 12, 14 in the configuration of FIG. 4.

All access nodes 12, 14 associated with a given user access terminal 10 should receive identical streams of data packets from the user terminal 10. As will be described later, the paths are monitored 52 to detect whether the path is live. Each access node 12, 14 encapsulates the packets it receives over the respective link 102, 104 and forwards them into the network for transmission to a destination user terminal 11. As the network perceives these streams to be different, their encapsulation is different and they are distinguishable from each other. They will in general take different routes (via nodes 15 and 18 respectively in FIG. 4) to the target access nodes 13, 18. Even if their routings coincide at some intermediate node, their different encapsulation makes this transparent to the intermediate nodes.

Data arriving at an access node 12 is de-encapsulated to identify the target user terminal 10. It is then either forwarded to the target user terminal 10, or discarded, in accordance with the instructions received from the control function 19 as will now be described.

Initially one of the paths 102, 104 is selected 50 for transmission of received data packets to the user terminal 10. This selection may be random, or on criteria such as the available capacity in the respective access nodes 12, 14. The selection may be varied from time to time, either periodically or in response to variations in demand for capacity at the access nodes 12, 14 or elsewhere in the network or, as will be seen, in response to a link failure at the remote end 11, 113, 118.

An instruction 51 is sent to the selected access node 12 to forward any data packets addressed to the user terminal 10. Any access node 14 that is not selected is instructed to shutdown the transmit port to prevent packets from being forwarded to the user equipment 10. This avoids interference at the user equipment 10. It should be noted that control frames and idle frames should also be prevented, as they too could interfere with the good signal As already mentioned, the incoming signals from the user equipment 10 over the links 102, 104 are monitored 52. If a signal is detected on each link, no action is taken (53). Should a loss of signal be identified (54), an alarm 55 is raised informing technical maintenance staff of the fault.

The failed path 102 is identified (57). An instruction 58 is generated to control the selection process 50 to prevent the failed path 102 being selected, either in response to a further fault arising (57) or otherwise (50), until the fault has been cleared. The node 12 associated with the failed path 102 is also instructed to cease to attempt to transmit to the user 10, so that if the fault is intermittent the resumption of traffic on the failed link 102 does not cause interference.

A similar instruction 59 is generated to modify the selection process 50 for the nodes 13, 18 associated with the user terminal 11 at the remote end, such that the node 18 associated with the failed path 102, 118 cannot be selected until the fault is cleared. This ensures that the user 11 continues to receive data from the user 10 over the intact path 104, 113.

The selection process 50 is then repeated. If the fault is on the path 102 served by the currently selected access node 12, the control system 19 selects another link 104 for transmission 57, and instructs the respective access node 14 accordingly (step 51 repeated).

The invention claimed is:

1. An access connection for connecting a user access point to an Ethernet network, the access connection comprising:
   one or more passive couplers, each passive coupler being connected to the user access point and one or more access nodes of the Ethernet network so as to provide a plurality of access connection paths between the user access point and the Ethernet network such that data can be exchanged, over each access connection path, between the user access point and the one or more access nodes, and
   a controller configured to control the one or more access nodes such that only one of the access connection paths transmits the data received from the network to the user access point,
   wherein the one or more access nodes comprises a detector configured to detect traffic received from the user access point over the access connection and, in the absence of such traffic being detected by one of the access nodes, to cause a different access connection to be selected for data transmission to the access point.

2. The access connection according to claim 1, further comprising a generator configured to generate a fault alarm in the event of the detection of such an absence of traffic.

3. The access connection according to claim 1, wherein the one or more access nodes comprises a generator configured to generate a distinct encapsulation of the data transmitted to the one or more access nodes from the user access point for transmission over the network, and a device configured to de-encapsulate data destined for the user access point that the one or more access nodes receives from elsewhere in the network, for transmission to the user access point.

4. The access connection according to claim 1, wherein the connection between the user access point and the one or more access nodes is an optical connection and the coupler is a passive optical coupler.

5. The access connection according to claim 1, wherein the access connection paths connect to different nodes.

6. An Ethernet network comprising:
   a plurality of interconnected access nodes connected by access connection paths to respective user access points, wherein each access node provides a receiver configured to receive data transmitted to said each access node from the respective user access point for transmission over the network, and a transmitter configured to transmit data destined for the user access point that said each access node receives from elsewhere in the network,
   at least one of the user access points being connected to one or more access nodes by way of a passive coupler such that a respective user access point is provided with a plurality of access connection paths by which data can be exchanged between the user access point and the network, and
   a controller configured to control the access nodes such that only one of the access connection paths transmits data received from the network to the respective user access point,
   wherein the access nodes comprise a detector configured to detect traffic received from the user access point and, in the absence of such raffle being detected on one of the access connection paths, to cause a different access connection to be selected for data transmission to the access point.

7. The Ethernet network according to claim 6, further comprising a generator configured to generate a fault alarm in the event of the detection of such an absence of traffic.

8. The Ethernet network according to claim 6, wherein, in the event of traffic on an access connection failing to be detected at an access node, indicating a failure of the connection, data is exchanged with a remote access node having an access connection to a destination user access point forming the remote end of the network path, the exchanged data being arranged such that the remote access connection is not selected for transmission of data to a respective user access point, thereby ensuring that data is transmitted to the remote user access point over another access connection, not forming part of the failed path.

9. The Ethernet network according to claim 8, wherein the exchange of information is mediated through a network control system.

10. The Ethernet network according to claim 6, wherein said each access node comprises a generator configured to generate a distinct encapsulation of the data transmitted to said each access node from the associated user access point for transmission over the network, and a device configured to de-capsulate data destined for the user access point that said each access node receives from elsewhere in the network, for transmission to the user access point.

11. A method of operating an Ethernet network, the method comprising:
    providing a user access point connected by way of a passive coupler to a plurality of access connection paths such that the passive coupler provides a respective user access point with a plurality of access connection paths over which data can be exchanged between the user access point and respective access nodes in the network, and controlling the access nodes such that only one of the access paths transmits data received from the network to the respective user access point, wherein in the absence of traffic received fro e user access point over the selected user access connection, a different access connection is selected for data transmission to the access point.

12. A method according to claim 11, wherein a fault alarm is generated in the event of the detection of such an absence of traffic.

13. A method according to claim 11, wherein, in the event of traffic on an access connection failing to be detected at a first access node, indicating a failure of the connection, data is exchanged with a second, remote access node having a second access connection to a second, destination user access point, the second access connection forming the remote end of the network path, the exchanged data being arranged such that the second access connection is not selected for transmission of data to the second user access point, thereby ensuring that data is transmitted to the second, remote user access point over another access connection, not forming part of the failed path.

14. A method according to claim 13, wherein the exchange of information is mediated through a network control system.

15. A method according to claim 11, wherein each access node generates a distinct encapsulation of the data transmitted to said each access node from the corresponding user access point for transmission over the network, and de-encapsulates data destined for the user access point that said each access node receives from elsewhere in the network, for transmission to the corresponding user access point.

* * * * *

UNITED STATES PATENT AND TRADEMARK OFFICE
CERTIFICATE OF CORRECTION

PATENT NO. : 8,730,940 B2  Page 1 of 1
APPLICATION NO. : 12/087012
DATED : May 20, 2014
INVENTOR(S) : Shehzad Mirza It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1277 days.

Signed and Sealed this

Twenty-ninth Day of September, 2015

Michelle K. Lee
*Director of the United States Patent and Trademark Office*